US012388832B2

(12) United States Patent
Fawcett

(10) Patent No.: US 12,388,832 B2
(45) Date of Patent: Aug. 12, 2025

(54) USER CONTACT CONTROL IN A NETWORK APPLICATION

(71) Applicant: Snap Inc., Santa Monica, CA (US)

(72) Inventor: Rudd Fawcett, New York, NY (US)

(73) Assignee: Snap Inc., Santa Monica, CA (US)

( * ) Notice: Subject to any disclaimer, the term of this patent is extended or adjusted under 35 U.S.C. 154(b) by 122 days.

(21) Appl. No.: 18/156,248

(22) Filed: Jan. 18, 2023

(65) Prior Publication Data

US 2024/0244061 A1 Jul. 18, 2024

(51) Int. Cl.
*H04L 9/40* (2022.01)
*H04M 1/72436* (2021.01)

(52) U.S. Cl.
CPC ............ *H04L 63/105* (2013.01); *H04L 63/20* (2013.01); *H04M 1/72436* (2021.01)

(58) Field of Classification Search
CPC ... H04L 63/105; H04L 63/20; H04M 1/72436
USPC .............................................................. 726/1
See application file for complete search history.

(56) References Cited

U.S. PATENT DOCUMENTS

| | | | | |
|---|---|---|---|---|
| 7,533,418 | B1 * | 5/2009 | Yoakum | G06F 16/9535 |
| | | | | 709/227 |
| 8,295,819 | B1 | 10/2012 | Kaplan et al. | |
| 8,755,772 | B1 * | 6/2014 | Natsis | H04W 4/60 |
| | | | | 455/412.2 |
| 10,070,308 | B2 * | 9/2018 | Carter | G06F 21/6245 |
| 10,129,257 | B2 * | 11/2018 | McGovern | H04L 63/20 |
| 10,194,010 | B1 * | 1/2019 | Donohue | H04L 51/212 |
| 10,904,175 | B1 * | 1/2021 | Jones | H04L 67/53 |
| 2003/0078981 | A1 * | 4/2003 | Harms | H04L 51/58 |
| | | | | 709/206 |
| 2004/0073643 | A1 * | 4/2004 | Hayes | G06Q 10/107 |
| | | | | 709/223 |
| 2004/0248597 | A1 * | 12/2004 | Mathis | H04L 51/48 |
| | | | | 455/466 |
| 2009/0092233 | A1 * | 4/2009 | Meli | H04M 1/2757 |
| | | | | 379/88.11 |
| 2010/0330972 | A1 * | 12/2010 | Angiolillo | H04M 1/2746 |
| | | | | 455/418 |
| 2013/0005370 | A1 * | 1/2013 | Tysowski | H04L 51/04 |
| | | | | 455/466 |
| 2014/0163994 | A1 * | 6/2014 | Lau | H04M 1/271 |
| | | | | 704/275 |

(Continued)

FOREIGN PATENT DOCUMENTS

WO WO-2024155813 A1 7/2024

OTHER PUBLICATIONS

"International Application Serial No. PCT/US2024/012014, International Search Report mailed Apr. 24, 2024", 3 pgs.

(Continued)

*Primary Examiner* — Dant B Shaifer Harriman
(74) *Attorney, Agent, or Firm* — Schwegman Lundberg & Woessner, P.A.

(57) ABSTRACT

A method for managing a contact list on a client device to enable user control of access to contacts, the method initiating a process including actions in response to a request to access user contacts. The method presents contact selection options on the client device, where the selection or control element allows for multiple controls. The user selects all, none or a subset of a user contact list and may control how the information is used by a network service.

18 Claims, 6 Drawing Sheets

(56) References Cited

U.S. PATENT DOCUMENTS

2014/0172917 A1\* 6/2014 Coroy ................. G06F 21/6218
707/783
2017/0366966 A1\* 12/2017 Carter ..................... H04L 51/48
2022/0358194 A1\* 11/2022 Gnanasekaran .... H04L 63/0861

OTHER PUBLICATIONS

"International Application Serial No. PCT/US2024/012014, Written Opinion mailed Apr. 24, 2024", 7 pgs.

\* cited by examiner

USER CONTACT CONTROL IN A NETWORK APPLICATION

TECHNICAL FIELD

The present disclosure relates generally to facilitating interactions between client devices over a network and specifically to controlled access to contact information and the use of this information.

BACKGROUND

Communication tools provide a digital medium for users to interact with each other to share experiences, photos, videos and more. Distributing content through a network allows a user to send information and connect with multiple users. Privacy issues inhibit some users from such connections, as sharing personal information puts their information at risk. Current use of contact lists provides a contact card for connections with such inherent risk.

Many applications and remote and network services require access to information stored on a client device to facilitate the applications and services; however, this requires the user to allow access to personal information and contact details stored in contact cards. Once access is given to this information, the user loses a certain amount of control and is not certain of the actual use by others. The user desire for security in an ever connected world is a concern for users.

BRIEF DESCRIPTION OF THE SEVERAL VIEWS OF THE DRAWINGS

In the drawings, which are not necessarily drawn to scale, like numerals may describe similar components in different views. To easily identify the discussion of any element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
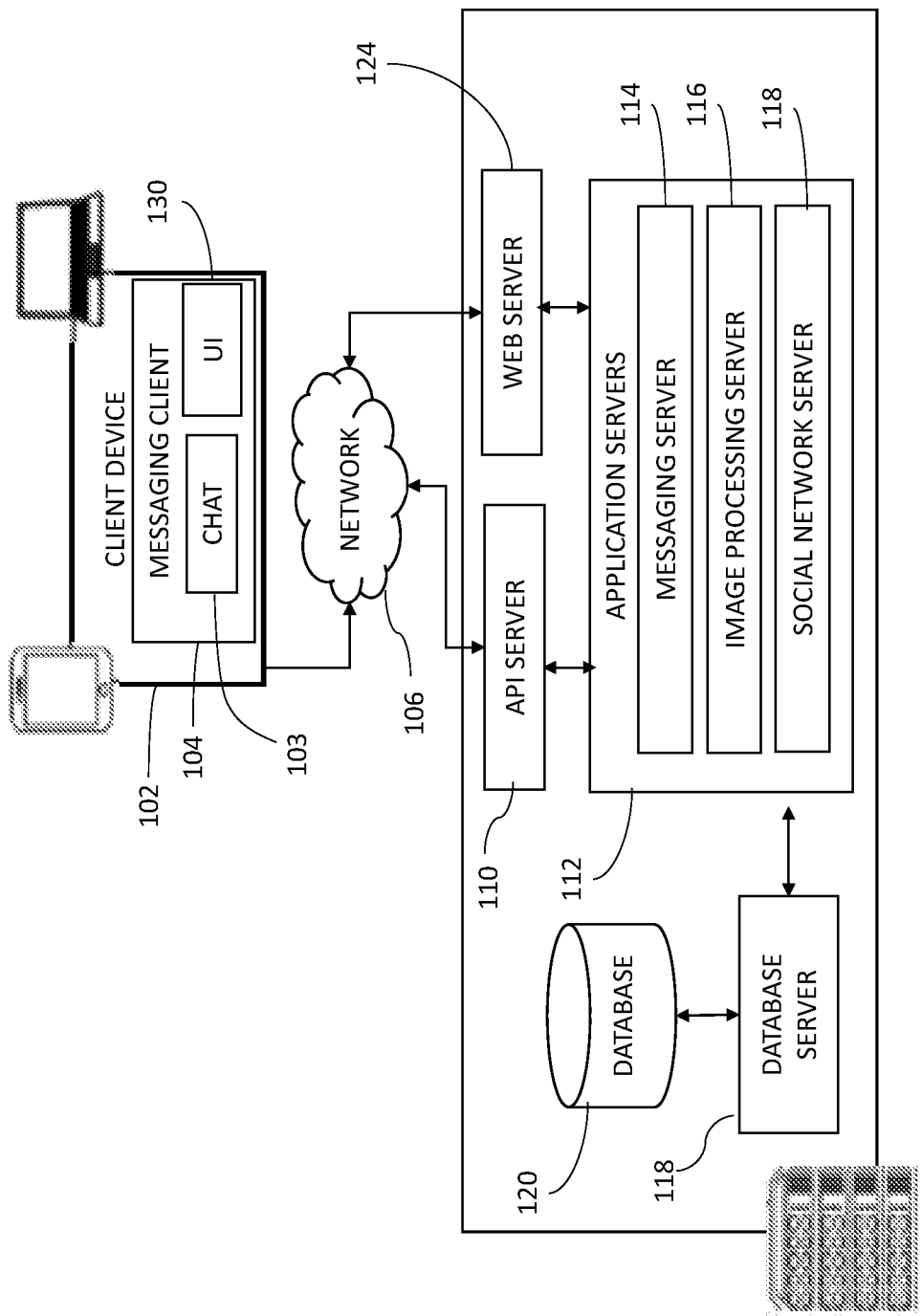
FIG. 1 is a diagrammatic representation of a networked environment in which the present disclosure may be deployed, in accordance with some examples.

As mentioned above, sharing user contact information with an application or service puts user's personal information at risk and misappropriation. Many apps used on mobile devices and other computing devices are network-connected in which the mobile device sends and receives data to and from remote endpoints connected to the network. The network-connected apps are subject to vulnerabilities as data is exchanged through the network communication between mobile apps and network endpoints. The network-connected apps and services require information to connect users, servers and endpoints, which may require the user to allow access to user contacts and other personal or sensitive information. Once the information is accessed by a service, the user cannot be sure of how the information is used, such as for advertisements, contact for other services, sharing with third parties and so forth. These are in addition to general security concerns of identity theft, malicious software, spam communications, phishing to procure information, and so forth.

Embodiments described herein address these technical issues by providing a process for a user to control and limit access to a user's contact information stored on a client device or user device for an application, network service and others, and as used herein these are collectively referred to as remote services. The process is triggered on any request for access to contact information and/or personal details and presents options to the user for control and protection of contact information. This includes allowing the user to define contact access rules and implement a strategy for access to and use of contact information.

The present embodiments are useful when using application provided through remote servers and services, such as messaging apps and others, where the services request access to contact information. For a mobile app, a remote service manages operation of the app and facilitates interactions with other participants. In these situations, the user initiates a service, such as an app acquired through an app store, and this includes opening the app on the client device and connecting the app with a remote server.

These embodiments enable a user to control the information provided to a remote service and the allowed interactions with a user's contacts. The information requested is typically stored on a client device in the form of a contact card, contact file or maintained in other storage formats. The user has control of the contact information on their device to add, delete, modify information. The user cannot, however, control the use of that information once it is provided to a service or other users.

To alleviate the user concerns and provide a more controlled and secure experience for users, a process is disclosed that allows a user to control access to the contact and to the amount of contact information, such as details stored as a contact card. Further, a user control further allows the user to define the extent of use of the allowed contact information by the application and/or network service. The use control settings are sent to the requesting service for implementation, such as for non-persistent retrieval and storage of contact information by the requesting service. In some examples, a request for access to contacts triggers a user interface process on the client device presenting options to the user to select contact access for the requested service and may also allow designated contact use rules for each contact.

A service requesting access to contacts will often request access to the contact list, which is access to all contacts and all information associated with the contacts. In other words, the service presents an option for access to all contacts or no contacts. There is not an option to allow access to select a specific group of contacts. In response to such request, the present inventions provide a user interface operable on a client device which provides user control over contact access irrespective of the option provided by the service. In some embodiments, the user interface may further provide user control of the specific contact information that may be accessed by the service and/or provide user control of the use of such information.

The user interface displays a selection screen enabling selection of contacts on the contact list and designate access control, as well as control of information in specific fields of a contact card, and use control of user contacts. The user may select to allow access to all contacts or to a subset of contacts for a requesting service, as well as access to specific information fields. The user interface also displays use control options, such as for the service to maintain the contact information in non-persistent memory while the app session is active and to remove contact information from storage after the app session terminates.

In one example, the communication system presents contact selection options on an electronic device for a user to select one or more individuals with whom to initiate a communication. In response to a selection of one or more individuals, the communication system accesses contact information corresponding to the selection and facilitates retrieval of contact information. The contact information is stored during a communication between the user and the one or more selected individuals and then removed from storage upon termination of the communication.

In one example, the user can build a group of contacts for an app session from a list of contacts on the client device. The communication system retrieves contact information for the selected contacts and stores the contact information in memory during the conversation between the users in the group. The communication system terminates storage of contact information in memory upon termination of the communication.

FIG. 1 is a block diagram showing an example messaging system 100 for exchanging data (e.g., messages and associated content) over a network, within which a voice chat system can be implemented. The messaging system 100 includes multiple instances of a client device 102, each of which hosts applications, including a messaging client 104. Each messaging client 104 is communicatively coupled to other instances of the messaging client 104 on other client devices 102 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video, or other multimedia data). The messaging client 104 is shown as including a voice chat component 103. The voice chat component 103 is configured to facilitate a voice chat between messaging clients by, for example, causing presentation of a chat conversation user interface (UI), receiving audio input, transcribing the audio input into a text format, and causing communicating of the audio input with or without the associated transcribed text, to the recipient device. The transcribing of the audio input can be performed at the client device 102, as well as at the messaging server system 108.

The messaging server system 108 provides server-side functionality via the network 106 to a messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. For example, the database 120 stores audio content from voice chat messages associated with the respective sender identifications, with or without the associated text. For the purposes of this description, a voice chat message includes an audio message (or a reference to the audio message) and the associated text representation of the audio. The audio content from a voice chat message may persist until an instruction to delete the voice chat message is received at the messaging system 108.

Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

The social network server 122 supports various social networking functions and services and makes these functions and services available to the messaging server 114. To this end, the social network server 122 maintains and accesses an entity graph within the database 120. Examples of functions and services supported by the social network server 122 include the identification of other users of the messaging system 100 with which a particular user has relationships or is "following," and also the identification of other entities and interests of a particular user.

Also shown in FIG. 1 is a voice chat component 103 provided at the messaging server 114. The voice chat exchange component 115 is configured to cooperate with the message client 104 to facilitate voice chat between messaging clients by, for example, causing presentation of a chat conversation UI, receiving audio input, transcribing the audio input into a text format, and causing communication of the audio input with or without the associated transcribed text, to a recipient device. The voice chat component 115 and the messaging clients? 104, collectively, may be referred to as a voice chat system. Client device 102 further includes a UI module 130 for control of contact information and other sensitive data.

Figure 2:
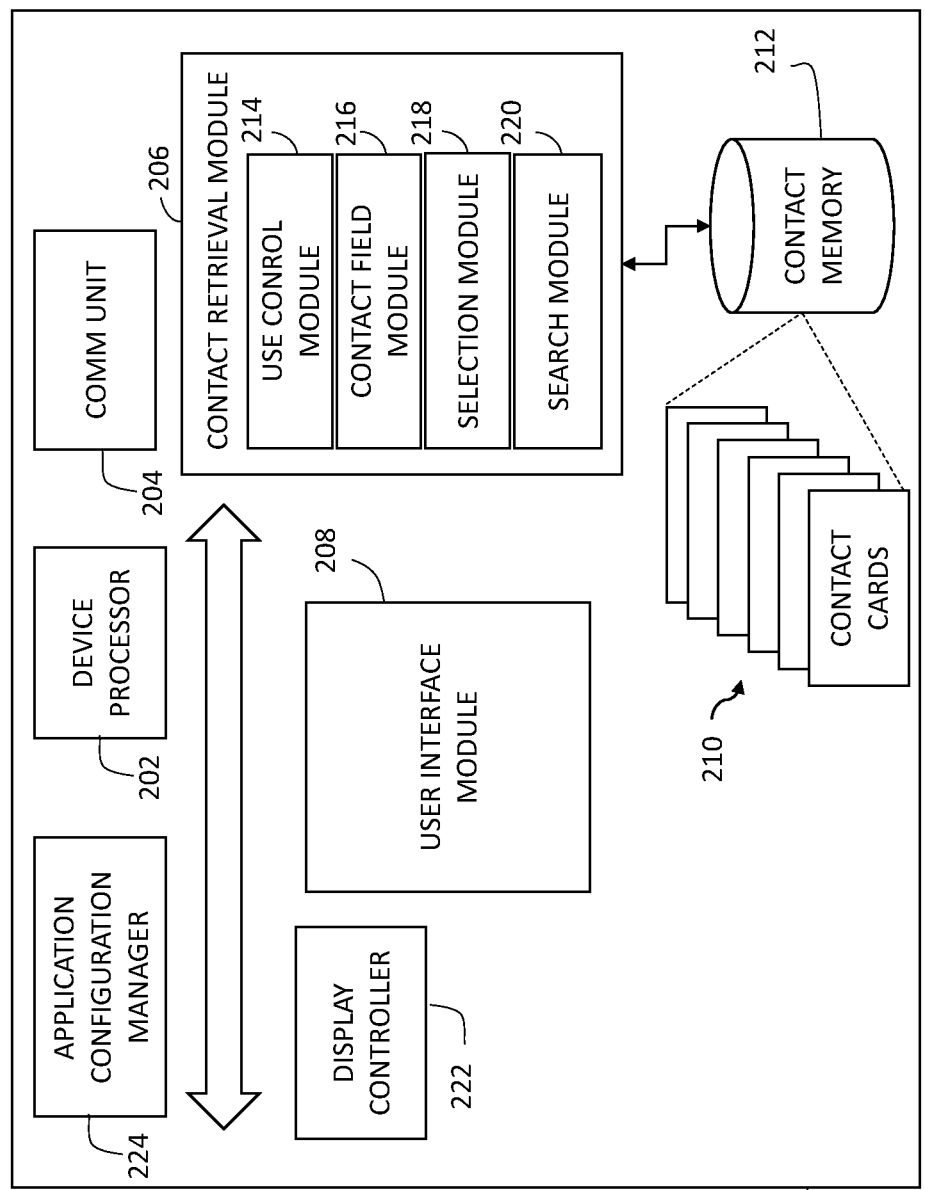
FIG. 2 is a flow diagram of operation in a messaging system, in accordance with some examples.
Figure 2:
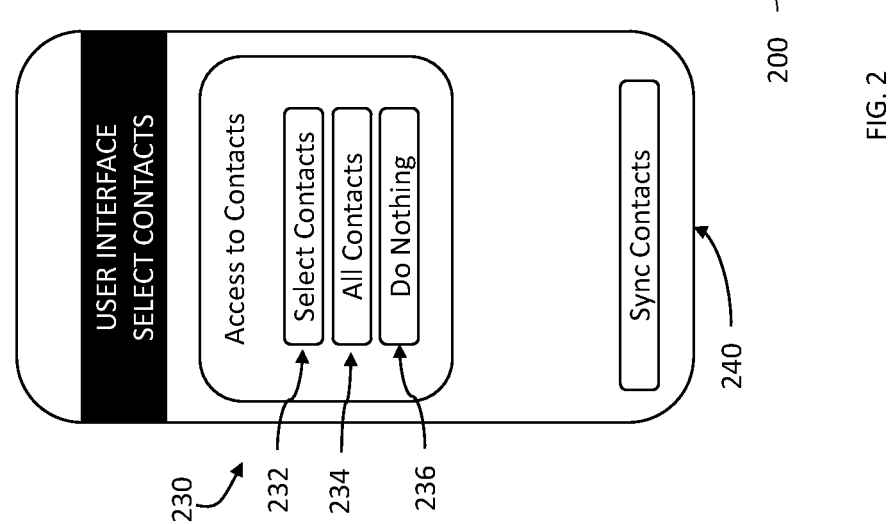

FIG. 2 is a block diagram of a client device 200, such as client 102 of FIG. 1, having a UI module 208, such as UI module 130 of FIG. 1. The client device 200 includes device processor 202 and an application configuration manager 224 to facilitate apps and services. Network-based apps initiated on client device 200 send and receive data with a network service to provide functionality for the apps. The client device 200 includes a display controller 222 to control presentation on display device 240. When client device 200 communicates with a network service the device processor 202 and application configuration manager 224 provide user identification to initiate the app on the network service and in response the network service requests information from the client device 200 including contact information, such as from contact cards 210. The interaction of the client device 200 and the network service is presented on display device 240, such as the user interface window 230) illustrated for contact selection.

The block diagram of a portion of client device 200, such as client device 102, details modules applicable to contact selection for network-based apps, where a contact retrieval module 206 includes modules to provide the user with control of access to contact information. Specifically, the UI module 208 acts to interface between the network service and the contact cards 210 to allow or limit access and which, if any, of the contact fields to share during use of the app. In this way, the UI module 208 protects the confidential information of a user's contacts and prevents exposure to the contact fields of the contact cards 210 stored in contact memory 212. The contact cards 210 form a contact list for the user on the client device 200.

The contact retrieval module 206 includes search module 220, selection module 218, contact field module 216 and use control module 214. In some option, contact field module 216 receives user selection of contact fields which are allowed or prohibited for sharing with the network services.

While an app is initiated, the client device 200 sends a message to the network service to start the app and receives a request for information, such as access to the contact list. The network service request triggers operation of user interface module 208, which presents a UI window on a display screen of device 200 illustrated as display device 240. The application configuration manager 224 prepares the client device 200 for running the app and provides app related information to the UI module 208, where the application configuration manager 224 prepares the information and data for operating with a remote server.

The UI 208 module effectively intercepts the request for contact access and instructs display controller 222 to present a user interface window 230 for contact selection 232, which is presented for one or more apps and services, and enables user to allow access to select contacts.

The user interface window 230 presents access options to a user including a select contacts option 232 allowing the user to select individual contacts from a contact list. User interface window 230 is provided as an example to illustrate the options provided to a user for contact selection and control, and there are other formats that may be presented as user interface windows that are consistent with device capabilities, size of display screens and so forth. In response to user selection of option 232, the user's contact list is presented on the display device 240 with ability to select individual contacts. From the group of contact selections, the UI module 208 passes the group information to selection module 218, where the group information from the contact cards 210 is retrieved and provided to UI module 208 to prepare a response to the original request for access to user contacts from the app or service. In some embodiments, selection of the first option 232 triggers presentation of a search field on display device 240 allowing the user to enter characters or numbers to search within the contact cards 210, for which the UI module 208 interfaces with a selection module 218 to retrieve the contact results to UI module 208.

Continuing with the user interface window 230, as illustrated a second option 234 to select all contacts and the user to enable access to all contacts. In response to selection of the second option 234, UI module 208 allows access to all contact cards 210 by the app or service. In some embodiments, selection of the first option or the second option results in presentation of an additional window for the user to specify the contact information fields in the contact cards 210. This allows the user to further limit access to contact information.

On presentation of the user interface window 230 to select contacts, a third option 236 to do nothing is presented in the user interface window 230 prohibits allowance to all of the contact cards 210. The UI module 208 provides no information, such as by a null set response. to the app or service when contact access is prohibited.

Figure 3:
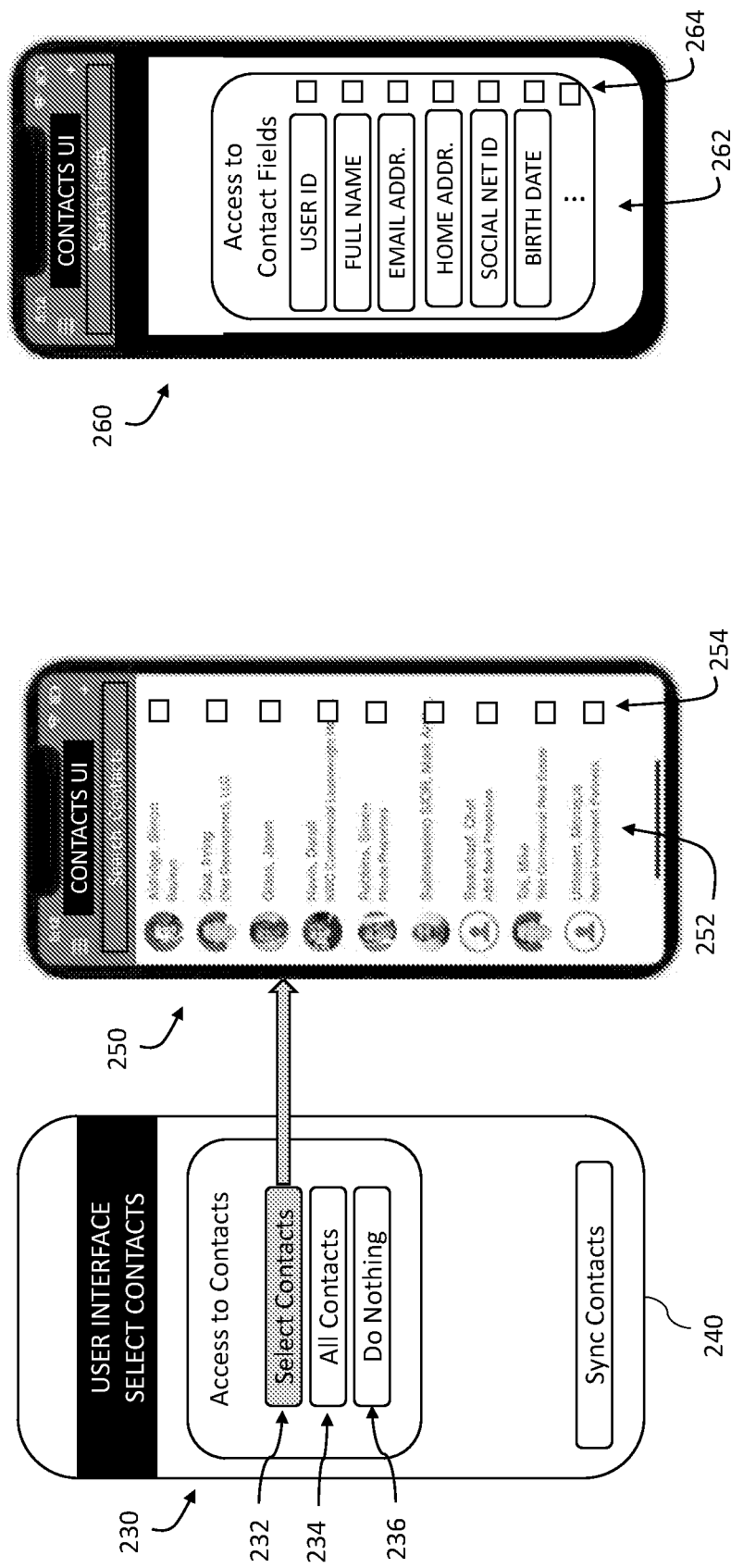
FIG. 3 is a flow diagram of operation in a messaging system, in accordance with some examples.

The UI module 208 receives each selection from the user and responds by applying the selection to retrieve all, some or none of the contacts from contact cards 210. The UI module 208 may store the selections and resultant contact information in memory (not shown). FIG. 3 illustrates an user interface window 230 when the user selects option one 232 enabling selection of individual clients in the client list. In response, the display device 240 presents a user interface window 250 presenting the client list. From selection of option 232 in window interface 230 the display device 240 displays a next user interface window 250 with client list 252 and selection boxes 254. In one example, UI module 208 provides an addition user interface window 260 to present a list of fields 262 in the contact card 210 along with selection boxes 264. On user selection of fields to share with the network service, the UI module 208 filters the other fields from network service access.

The client device 200 includes a communication unit 204 to communicate with remote users and services, such as network services for the apps and services discussed herein. displaying a UI window for selecting contacts, wherein the UI window is presented in response to a request from an app or servers. The communication unit 204 may manage a variety of communication protocols, including wireless, wired, Bluetooth and so forth. Messages sent between the client device 200 and a network service are transmitted through the communication unit 204 through a network, such as network 106.

Figure 4:
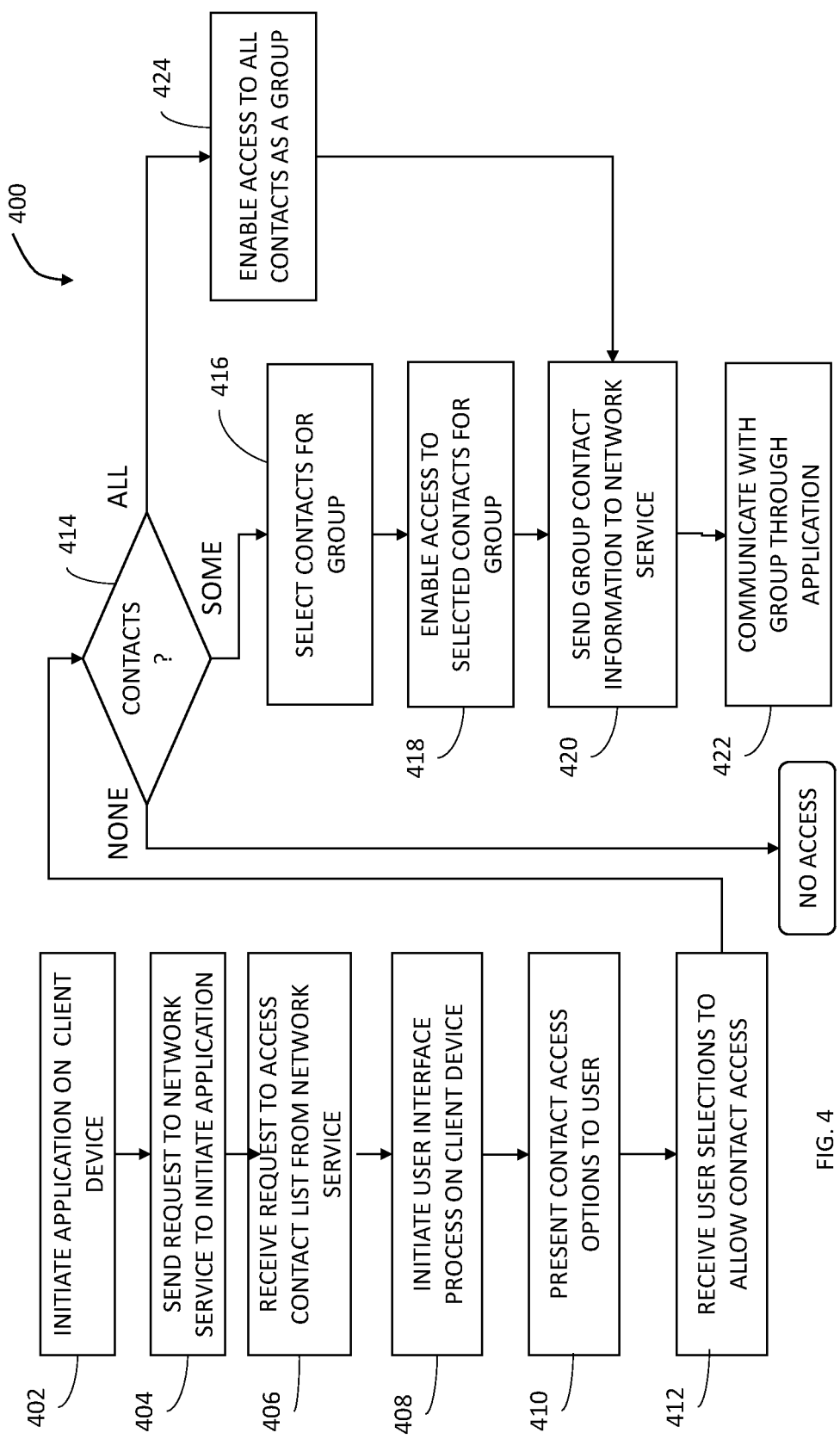
FIG. 4 is a diagram of a messaging system, in accordance with a messaging system, in accordance with some examples.

The UI module 208 operation is detailed in FIG. 4 as method 400 as client device 200 initiates an app, 402, and sends a request to network service, 404, to start running the app. The client device 200 receives a request from the network service to access a user contact list, 406, and in response, the client device 200 initiates a user interface process, 408. This presents contact access options to the user, 410, as illustrated in user interface window 230 of FIG. 2. The client device 200 receives user selections to allow contact access, 412, and determines if all contacts, no contacts or specific contacts, 414. For a selection of all contacts, the process enables access to all contacts as a group, 414, and sends group contact information to network service, 420). When the user selects to provide no access to contacts the client device 200 prohibits access to the contact list. When the user opts to select individual contacts, the process 400 receives the selected contacts, 416, and enables access to the selected contacts for group, 418. The group contact information is then sent to network service 420. The client device 200 communicates with the group through the application 422. Communications include person to person communications, multicast communications and broadcast communications.

Figure 5:
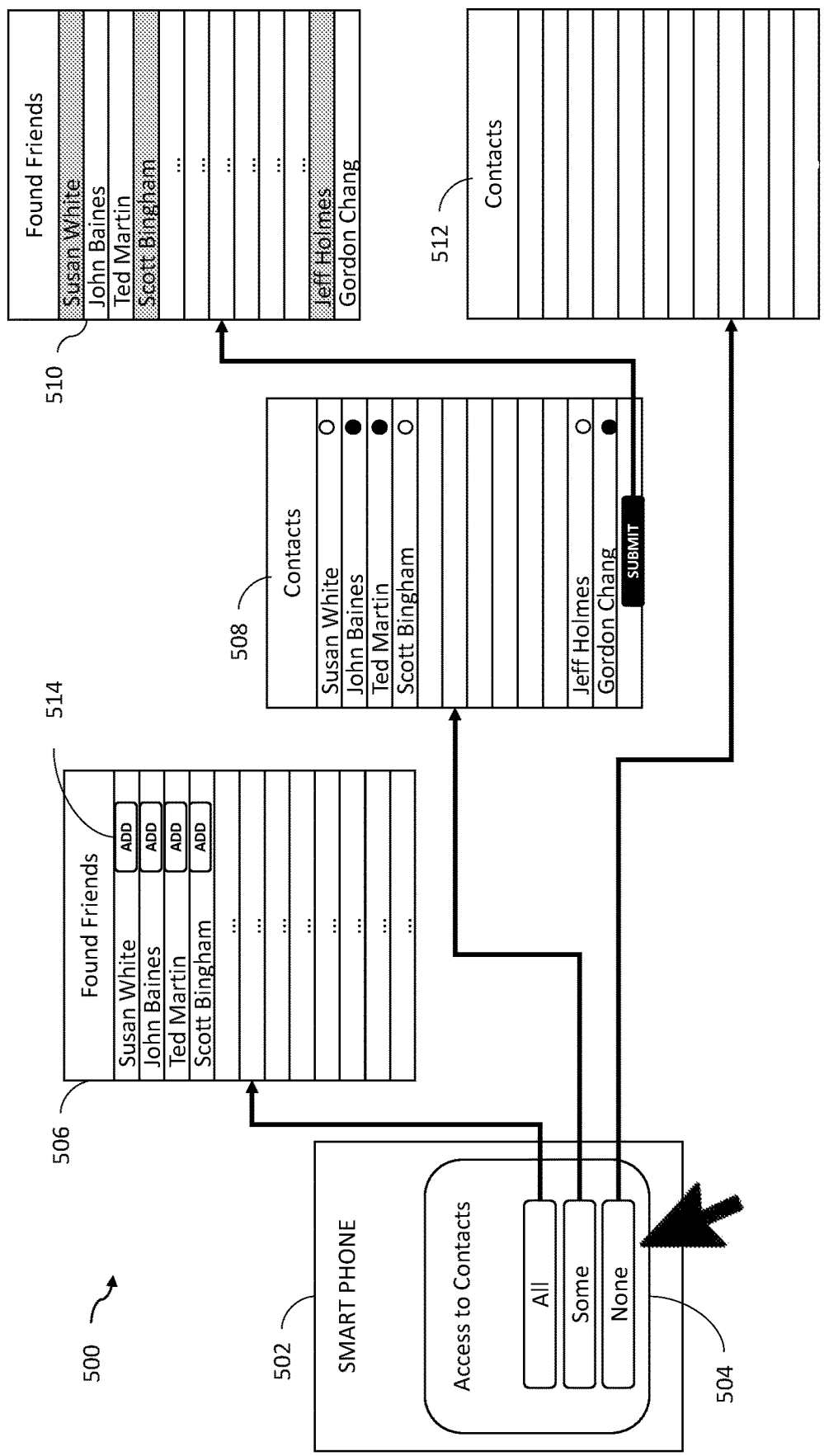
FIG. 5 is a diagrammatic representation of contact retrieval, in accordance with some examples.

FIG. 5 is a diagrammatic representation 500 of contact selection in a smart phone 502 as a client device having the user interface window 504. The smart phone 502 presents the user to access contacts, according to various options 504. The options 504 are displayed as selection elements which trigger actions in response to user selections. The user interface process applies when a user initiates an app or when a user receives an invitation from an app. In FIG. 5 the option paths are illustrated, where selection of the option for all contacts leads to presentation of window 506 listing all the friends and providing ADD buttons 514 to allow import of contacts not currently in the contact list by sending a request to become friends in this app. When the user ops to select contacts for sharing, this leads to window 508 presenting the contact list and selection circles. Once contact selections are complete, a window 510 presents the group list that is sent to the network service. These are illustrated as examples and other examples may be implemented to provide user control of contact access. Additional controls and features may be added depending on the app, the client device, the net service and so forth. User interface windows may be implemented for different devices and functions, such as to identify users by criteria or assign groups of users to specific apps. Some examples provide criteria for identifying users by shared interest, device type or other criterion.

Figure 6:
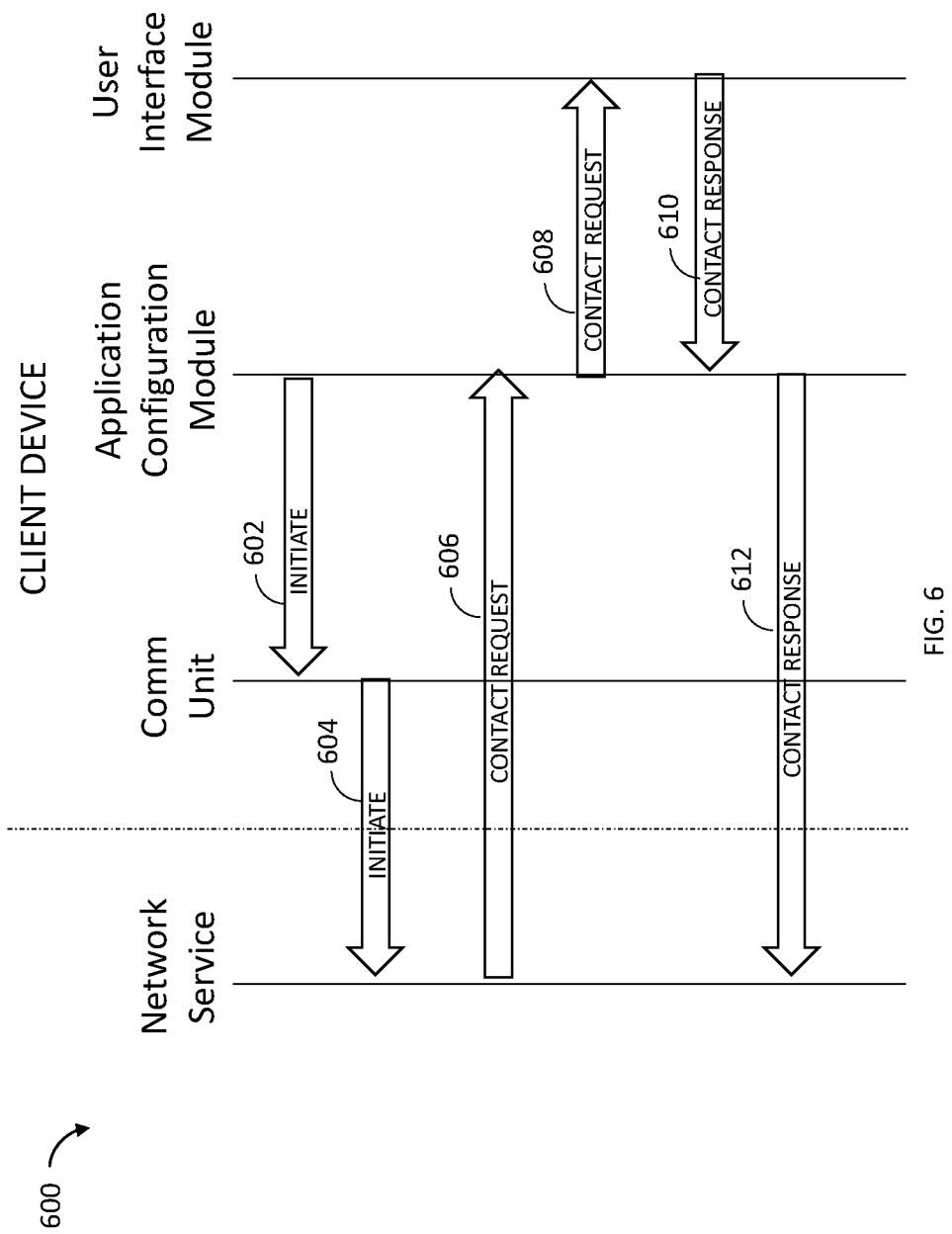
FIG. 6 is a signal flow diagram of operation of a system, according to examples of the present invention.

FIG. 6 illustrates a data flow diagram 600 where an app configuration unit within a client device initiates an app by sending a message 602 to a communication unit, which is transmitted as message 604 to network service. The network service responds to the request with a message 606 to the application configuration module requesting access to a user contacts. The message requesting contacts triggers interaction with the user interface module with message 608. The user interface module performs the contact selection process to allow the user to make contact selections, which are provided to application configuration module by message 610. The contact response message 612 is forwarded to network services.

The present methods and systems give the user options to protect the contact information storing data only when needed and not maintaining the information in the system. The full contact card information is not stored in the system, but rather remains with the user.

The present inventions resolve technical issues of security and privacy in network-based apps by providing a process for a user to control and limit access to a user's contact information stored on a client device or user device for an application, network service and others, and as used herein these are collectively referred to as remote services. The process is triggered on any request for access to contact information and/or personal details and presents options to the user for control and protection of contact information. This includes allowing the user to define contact access rules and implement a strategy for access to and use of contact information.

What is claimed is:

1. A method for a computing device, comprising:
    selecting an application from a plurality of applications stored on the computing device, the application configured to communicate with contacts on a contact list stored on the computing device through a remote server;
    sending a request to the remote server to initiate the application on the computing device;
    receiving a request from the remote server to access the contact list stored on the computing device;
    in response to receiving the request from the remote server, initiating a user interface process on the computing device, the user interface process operating locally on the computing device, the user interface process comprising:
    presenting a user interface window on a display of the computing device;
    presenting contact access options on the user interface window;
    receiving user selections to allow remote server access to a set of contacts on the contact list;
    assigning use control rules to the set of contacts, each use control rule specifying at least one remote server action limiting use of contact information for a respective contact of the set of contacts, at least one use control rule of the use control rules requiring the remote server to delete corresponding contact information on termination of the application;
    and
    sending a response to the remote server allowing access to the set of contacts.

2. The method of claim 1, wherein the user interface process further comprises:

assigning an access level for each contact in the set of contacts, the access level specifying the contact information accessible by the remote server.

3. The method of claim 1, wherein the contact information comprises a set of fields including at least one of a contact full name, a contact email address, a contact home address, a contact phone number, and contact personal details.

4. The method of claim 3, further comprising:
prohibiting remote server access to contacts not included in the set of contacts.

5. The method of claim 2, wherein the set of contacts includes no contacts on the contact list.

6. The method of claim 1, wherein the user interface process further comprises:
presenting the contact list on the user interface window; and
presenting at least one access level selection option for each contact on the contact list.

7. The method of claim 1, wherein at least one use control rule of the use control rules specifies allowable remote service operations involving corresponding contact information.

8. The method of claim 1, wherein the user interface process further comprises:
presenting the contact list on the user interface window; and
presenting at least one use control rule selection option for each contact in the set of contacts.

9. A machine-readable non-transitory storage medium having instruction data executable by a machine to cause the machine to perform operations in a messaging system for exchanging data over a network by:
in response to a request to interact with a communication application:
presenting a plurality of contact selection options on an electronic device, the plurality of contact selection options being associated with a contact list;
accessing a first user selection of one of the plurality of contact selection options;
filtering the contact list according to the first user selection to generate a filtered contact list;
presenting the filtered contact list on the electronic device;
accessing a second user selection of a first set of contacts from the filtered contact list;
retrieving contact information for the first set of contacts;
enabling storage of the contact information temporarily in memory;
assigning use control rules to the first set of contacts, the use control rules specifying remote server actions limiting use of the contact information for a respective contact of the first set of contacts, at least one use control rule of the use control rules requiring the remote server to implement a deletion of the contact information on termination of the application; and
enabling access to the contact information during a communication.

10. The medium of claim 9, the operations further comprising inviting a new contact to the first set of contacts.

11. The medium of claim 9, wherein the communication comprises a chat function over a network.

12. The medium of claim 9, wherein the contact information is a subset of information stored in the contact list.

13. The medium of claim 9, wherein the filtered contact list is stored for use during the communication.

14. The medium of claim 13, wherein presenting the plurality of contact selection options further comprises presenting an option control element.

15. The medium of claim 14, wherein presenting the filtered contact list further comprises presenting a contact selection control element.

16. The medium of claim 9, wherein the first set of contacts includes all contacts in the contact list.

17. The medium of claim 9, wherein the first set of contacts is a null set.

18. The medium of claim 9, wherein the contact selection options include an add option to invite a new contact.

* * * * *